United States Patent [19]

Matsumoto

[11] Patent Number: 4,465,163
[45] Date of Patent: Aug. 14, 1984

[54] FLOATING DISK BRAKE

[75] Inventor: Atsuo Matsumoto, Hyogo, Japan

[73] Assignee: Sumitomo Electric Industries, Ltd., Japan

[21] Appl. No.: 354,266

[22] Filed: Mar. 3, 1982

[30] Foreign Application Priority Data

Mar. 9, 1981 [JP] Japan .................................. 56-35522

[51] Int. Cl.³ .............................................. F16D 65/02
[52] U.S. Cl. ................................ 188/73.39; 188/73.45
[58] Field of Search ............... 188/73.31, 73.39, 73.43, 188/73.44, 73.45, 73.47

[56] References Cited

U.S. PATENT DOCUMENTS 4,109,766  8/1978  Inoue et al. .................. 188/73.45 X
4,122,920 10/1978  Harvey ............................ 188/73.45

Primary Examiner—Duane A. Reger
Attorney, Agent, or Firm—Harness, Dickey & Pierce

[57] ABSTRACT

A disc brake includes a stationary member and a torque receiving member connected therewith. The torque receiving member is formed of a metal rod bent generally into a U-shape, and having screw members extending from the ends. The brake further includes slide pins threadedly connected to the torque receiving member so that the slide pins, the stationary member and the torque receiving member are unitarily connected.

8 Claims, 4 Drawing Figures

FLOATING DISK BRAKE

BACKGROUND OF THE INVENTION

The present invention relates to a slide pin floating type disc brake.

In such a disc brake, a torque member is, as is well known, fixed to the vehicle body, and serves to receive the brake torque applied to the brake pads, and also to slidably support the brake pads. Accordingly, the torque member is required to be sufficiently strong and stiff, with respect to the brake torque. Simultaneously, the torque receiving surface of the torque member must be smooth enough to allow the brake pads to slide smoothly thereon.

For these reasons, the conventional torque member has several problems in that it is complicated in configuration, heavy in weight and requires many machining processes, thereby resulting in a high manufacturing cost.

SUMMARY OF THE INVENTION

Accordingly, it is an object of the present invention to provide a torque member in which the necessary functions thereof are throughly furnished, the construction thereof is simple, and the manufacturing cost thereof is low.

BRIEF DESCRIPTION OF THE DRAWINGS

The present invention will be described with reference to the accompanying drawings, wherein.

DETAILED DESCRIPTION OF THE PREFERRED EMBODIMENTS

Figure 2:
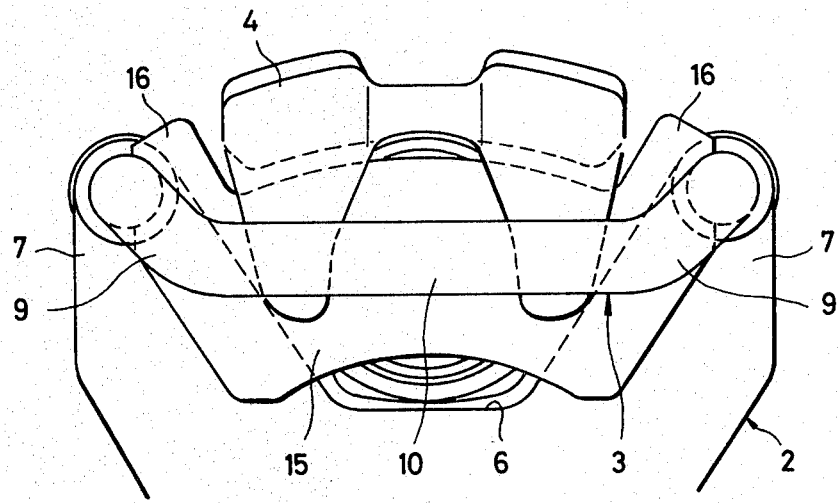
FIG. 2 is a partial front view illustrating the disc brake shown in FIG. 1.
Figure 3:
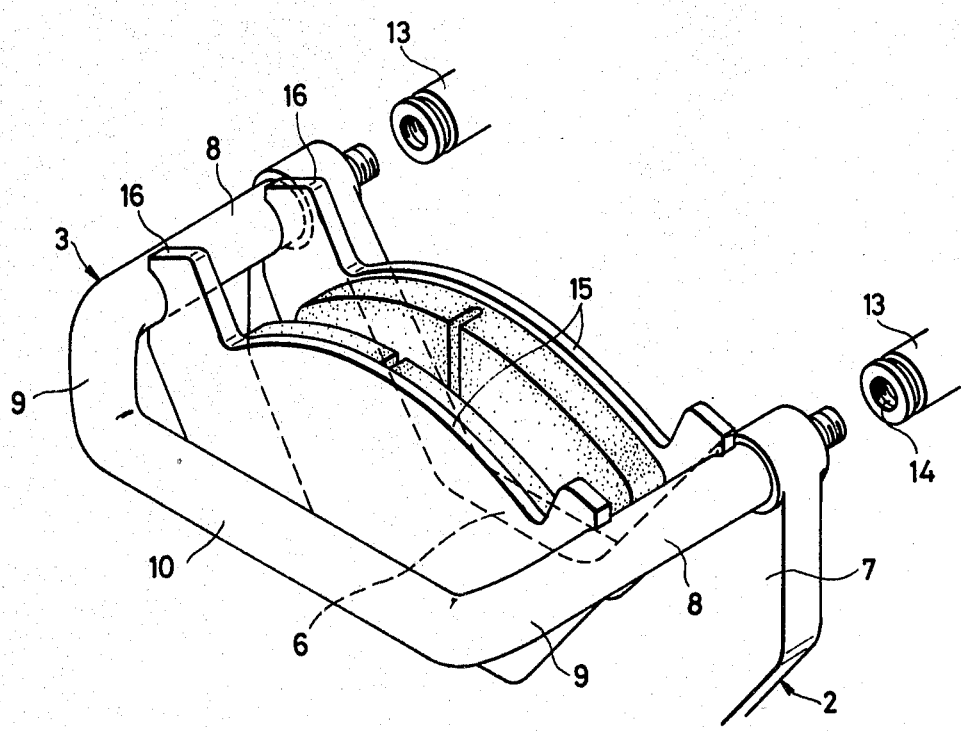
FIG. 3 is a perspective view of the torque member when disassembled.

The torque member 1 of the present invention consists of a combined unit of a stationary member 2 and a torque receiving member 3. The stationary member 2 is made of a plate, casting or forging. The member 2 is formed with a recess 6 which is provided in the portion thereof confronting a cylinder portion 5 of a caliper 4, as shown in FIGS. 2 and 3. The stationary member 2 is also formed with connecting arm portions 7 which are provided on both sides of the recess 6, by which the member 2 is connected to the torque receiving member 3.

The torque receiving member 3 is formed by bending a round metal rod so as to be U-shaped as a whole. That is, the U-shaped torque receiving member 3 consists of torque receiving sections 8 at both ends thereof, bend sections 9 at respective ends of the torque receiving sections 8 and a bridge section 10 integrally connecting the torque receiving sections 8 through the bend sections 9.

The bridge section 10 is slightly bent inwardly of the brake at each of the bend portions 9 so as not to contact the end portions of the caliper and the disc, as shown in FIG. 3.

Figure 1:
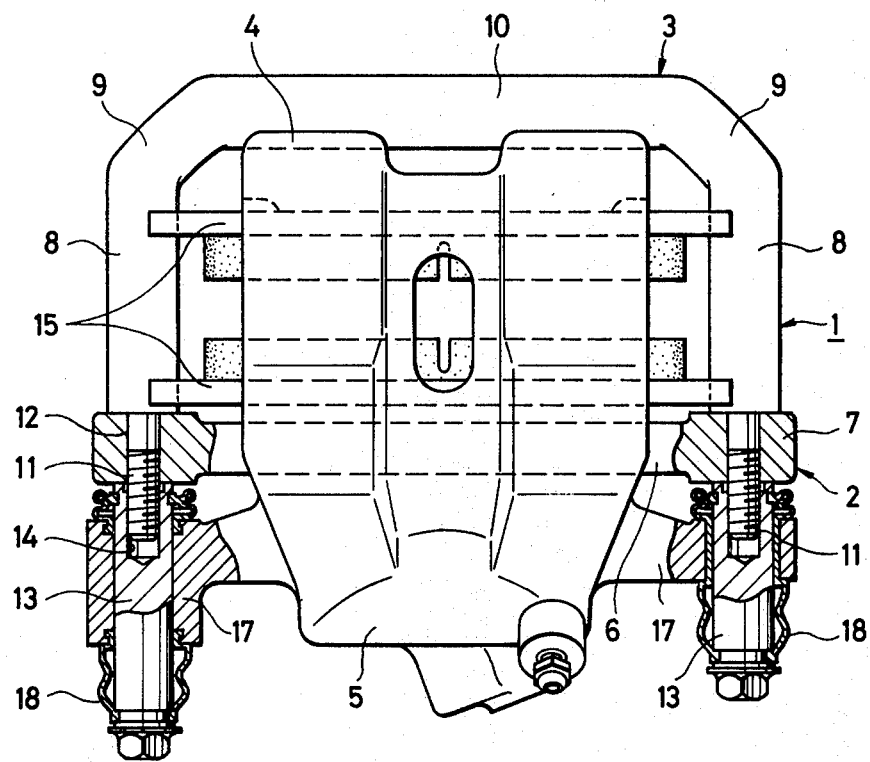
FIG. 1 is a plan view, partially in cross-section, illustrating a disc brake using a torque member according to the present invention.

On the respective ends of the torque receiving sections 8, a male screw portion 11 having a small diameter is formed as shown in FIGS. 1 and 3. The male screw portion 11 is inserted through a small diameter through-hole 12 provided in the connecting arm section 7 to be screwed in a female screw portion 14 provided on one end of a slide pin 13, whereby the stationary member 2, the torque receiving member 3 and a caliper guide member including the slide pins 13 and rubber boots 18 are all united.

Flange portions 16 of the brake pads 15 are slidingly fitted on the torque receiving sections 8 of the torque receiving member 3. Slide arms 17 of the caliper 4 are inserted onto the slide pins 13, respectively. One of the pins 13 is covered with the rubber boot 18 interposed between the pin 13 and the slide arm 17, while the other pin is covered by the rubber boot 18, with a bushing interposed between the pin and slide arm.

Figure 4:
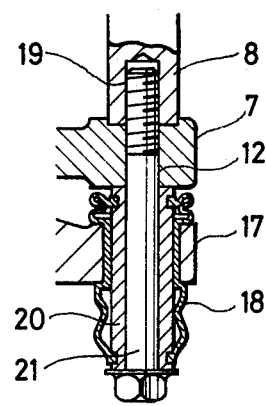
FIG. 4 is a sectional view showing another embodiment of a connecting portion according to the present invention.

In addition, as shown in FIG. 4, a female screw 19 may be provided on the respective ends of the torque receiving sections 8 in a manner so as to coincide with the through-hole 12 of the connecting arm portion 7. A sleeve bolt 21 may be inserted through the hole 12 so as to be screwed in the female screw 19. Thus, the stationary member 2, the torque receiving member 3 and the caliper guide member may all be united.

As mentioned above, the disc brake according to the present invention is equipped with not only the combined unit of the stationary member 2 and the torque receiving member 3 formed by bending the round metal rod, but also with the caliper guide member. In general, a round metal rod which has been subjected to cold forging has a relatively smooth surface. According to the present invention, the surface of the round metal rod thus subjected to cold forging is further finished by a centerless grinding before bending. Accordingly, even though additional machining may be required to make the member sufficiently smooth, the number of the machining steps for the torque receiving surface can be sharply reduced and the necessary cost for equipment, etc., can be also reduced. Additionally, it is possible to obtain sufficient strength and stiffness of the whole torque member by integrally forming the bridge section 10 and the torque receiving sections 8,8.

Furthermore, it is easy to disassemble the disc brake of the present invention, since the stationary member is simple in shape and the torque member is combined therewith by a simple screw. Therefore, the disc brake of the present invention can be utilized as a so-called integral knuckle disc brake.

What is claimed is:

1. A disc brake comprising: a pair of brake pads adapted to be disposed on opposite sides of an associated brake rotor, actuating means for moving said brake pads into engagement with the brake rotor, a torque member including a combined unit of a stationary member and a torque receiving member formed by bending a metal rod, said stationary member having a connecting portion for connection to said torque receiving member, said torque receiving member including torque receiving sections arranged in parallel with each other, and an integral bridge section bridging and connecting said torque receiving sections, and said brake pads being slidably engaged with said torque receiving sections for holding said brake pads against rotation with the brake disc upon engagement therewith, said torque receiving section being connected to said connecting portion of said stationary member at a point spaced from said bridge section, so as to be united therewith.

2. A disc brake as claimed in claim 1, further comprising slide pins operatively affixed with said torque receiving member for slidably supporting the actuating means.

3. A disc brake as claimed in claim 2, wherein said torque receiving sections include screw means at the ends thereof contiguous to said connecting portion, said slide pins being threadedly connected to said torque receiving sections by means including said screw means, and the actuating means comprises a caliper member.

4. A disc brake as claimed in claim 3, said torque receiving member, said stationary member and said slide pins being united via said screw means, said slide pins being provided with boot means thereover.

5. A disc brake as claimed in claim 1, said round metal rod being cold forged and smoothed prior to bending.

6. A disc brake as claimed in claim 1, said bridge section joining said torque receiving sections by means of bent portions.

7. A disc brake as claimed in claim 3 wherein the screw means comprises threaded ends formed integrally on the ends of said torque receiving sections and extending through said stationary member connecting portion, said slide pins being threadedly engaged with said threaded portion and affixing said torque receiving member to said stationary member.

8. A disc brake as claimed in claim 3 wherein the screw means comprises female screw threaded openings formed in the ends of said torque receiving sections and through bolts extending through the slide pins and threadably engaged with said female threaded openings for affixing said torque receiving member to said stationary member and said slide pins to said stationary member.

* * * * *